(12) United States Patent
Brezina et al.

(10) Patent No.: US 6,540,414 B1
(45) Date of Patent: Apr. 1, 2003

(54) INTEGRATED OPTICAL COUPLER AND HOUSING ARRANGEMENT

(75) Inventors: Johnny Roy Brezina, Austin, TX (US); Brian Michael Kerrigan, Cary, NC (US); Gerald Daniel Malagrino, Jr., Rochester, MN (US); James Robert Moon, Oronoco, MN (US); Michael Lynn Zumbrunnen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/970,974

(22) Filed: Oct. 5, 2001

(51) Int. Cl.[7] .................................................. G02B 6/36
(52) U.S. Cl. .......................... 385/92; 385/56; 385/59; 385/88; 361/816; 264/1.1
(58) Field of Search ............................. 385/53–56, 59, 385/88–94; 361/816; 264/1.1

(56) References Cited

U.S. PATENT DOCUMENTS 5,199,093 A * 3/1993 Longhurst .................... 385/88
6,450,703 B1 * 9/2002 Shirakawa .................... 385/92

* cited by examiner

Primary Examiner—Phan T. H. Palmer
(74) Attorney, Agent, or Firm—Rabin & Berdo, PC; Robert H. Berdo, Jr.

(57) ABSTRACT

An optical coupler and housing arrangement includes a housing portion adapted to receive an optical connector of a fiber optic cable, and further includes an optical coupler portion integrally formed with the housing portion. The optical coupler portion is adapted to transmit optical signals to and from the fiber optic cable. The optical coupler portion has a plurality of optical fibers for transmitting the optical signals. Each of the optical fibers extends from one end surface of the optical coupler portion to another end surface of the optical coupler portion. The housing portion has a recess for receiving the optical connector, with one of the end surfaces of the optical coupler portion forming a back surface of the recess.

52 Claims, 7 Drawing Sheets

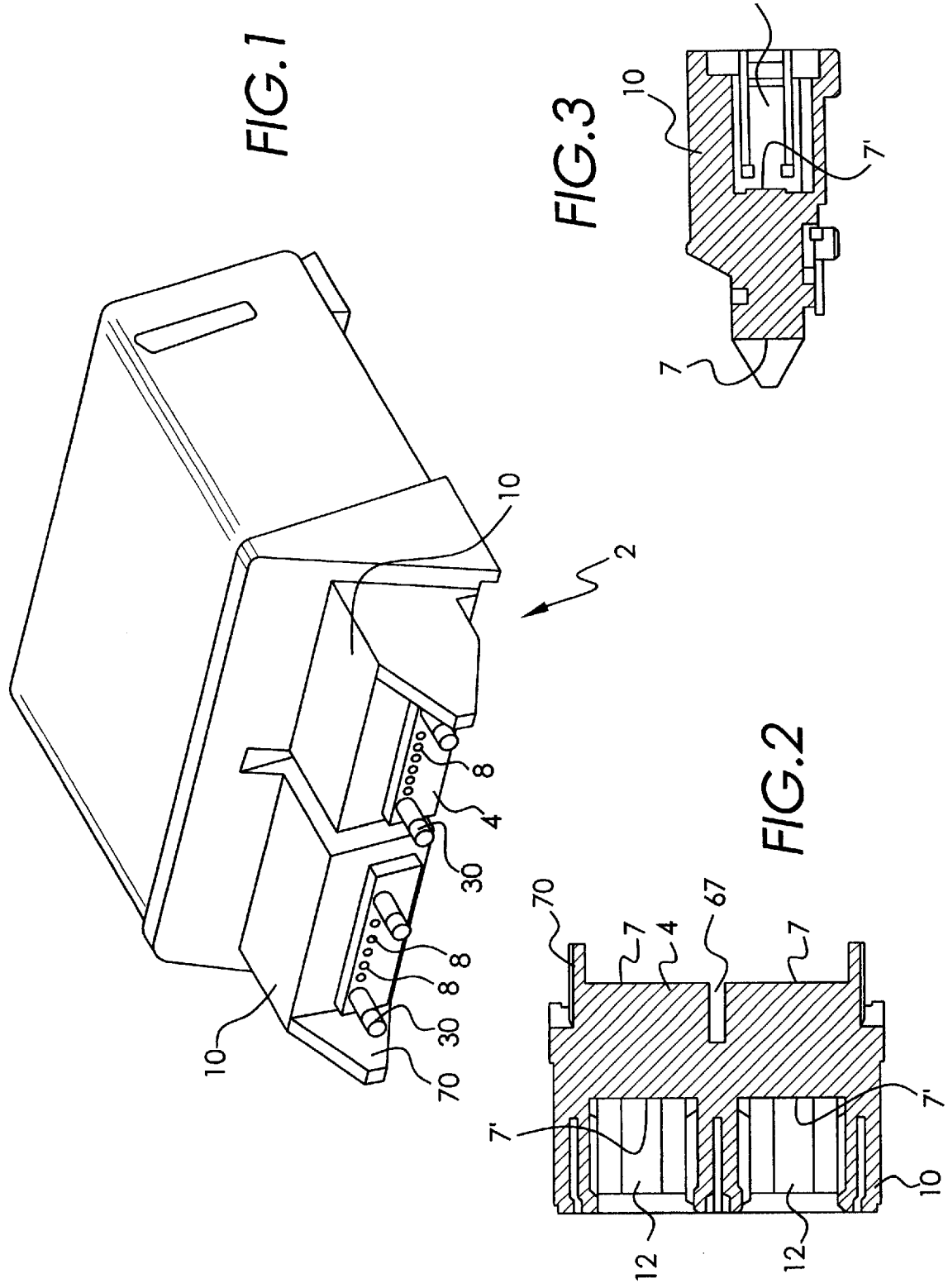

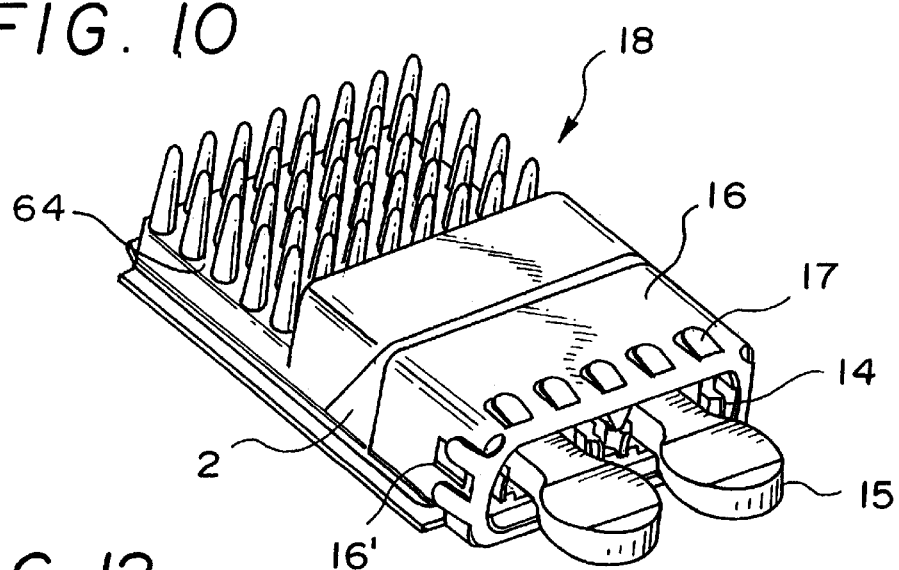
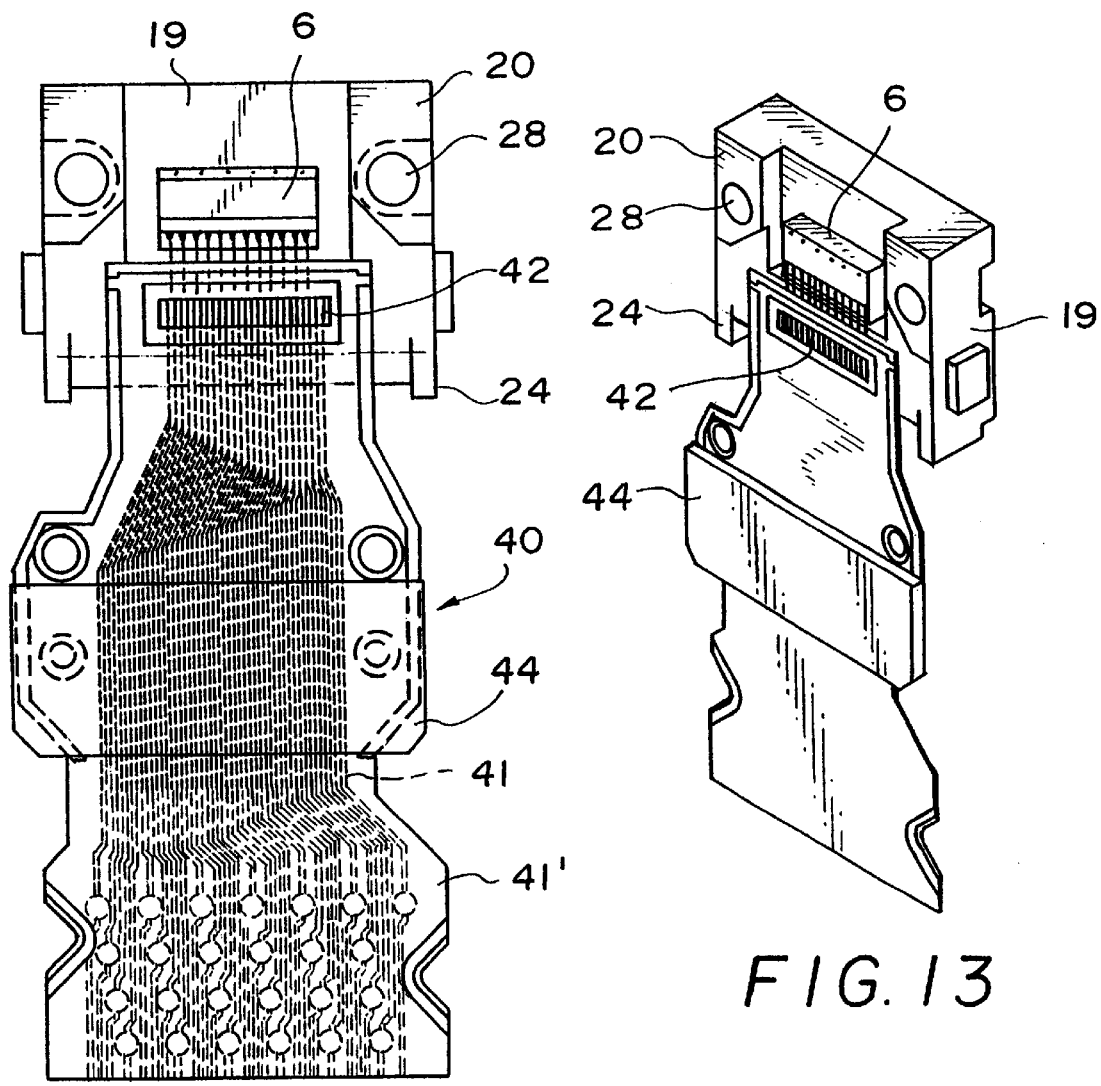

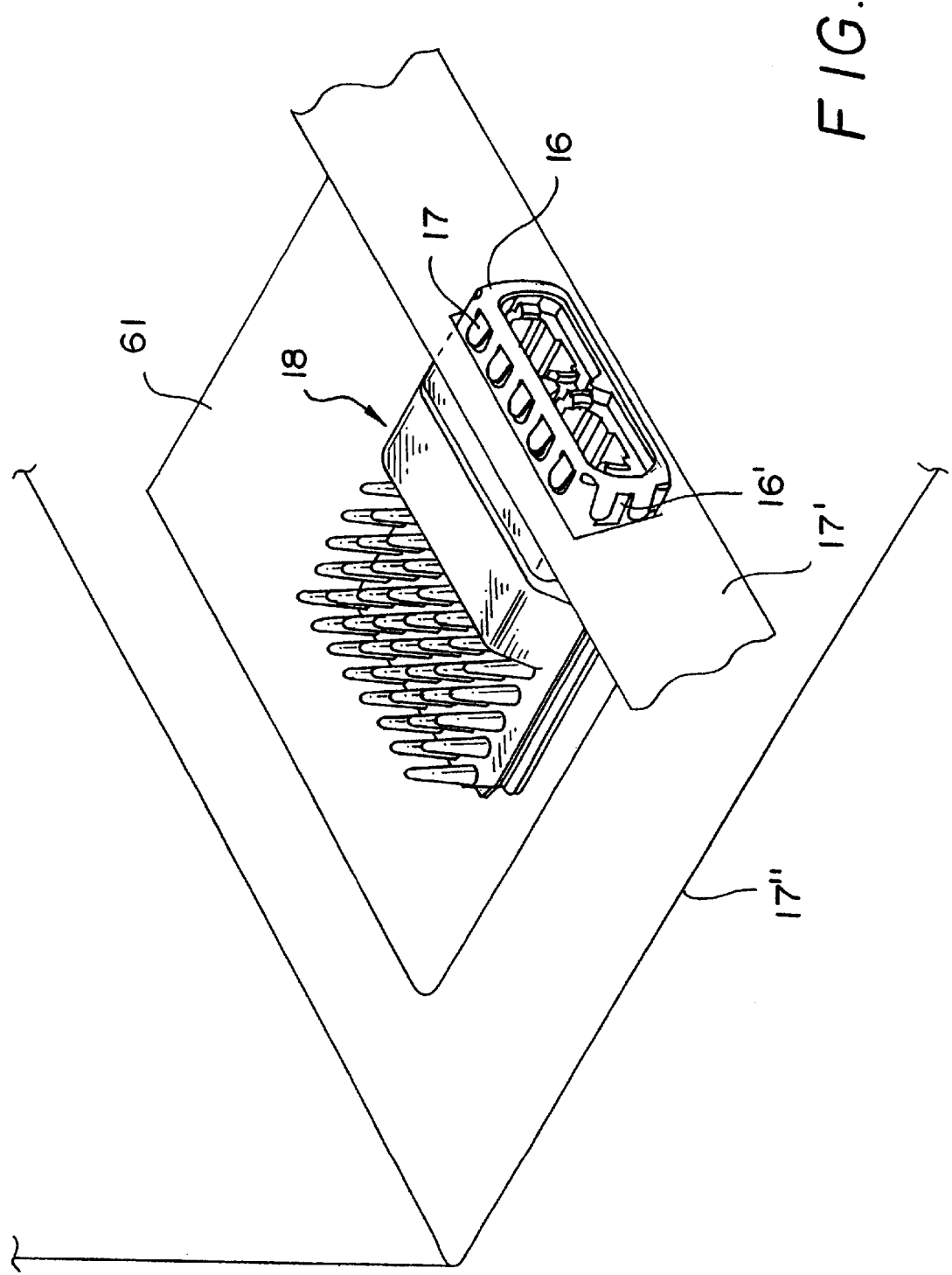

INTEGRATED OPTICAL COUPLER AND HOUSING ARRANGEMENT

CROSS REFERENCE TO RELATED APPLICATIONS

The subject matter of this application is related to the disclosures contained within U.S. patent application Ser. No. 09/894,934, entitled Enhanced Optical Transceiver Arrangement; within U.S. patent application Ser. No. 09/894,714, entitled Enhanced Optical Coupler; and within U.S. patent application Ser. No. 09/893,812, entitled A Processing Protective Plug Insert for Optical Modules, all having been assigned to International Business Machines, Corporation, and all having been filed on Jun. 28, 2001.

BACKGROUND OF THE INVENTION

1. Field of the Invention

The present invention relates to an integrated optical coupler and housing arrangement, and in particular, to a housing and integrated optical coupler arrangement that is used to optically couple and align a light emitter or light detector with an optical fiber connector.

2. Background Information

Computer and communication systems are now being developed in which optical devices, such as optical fibers, are used as a conduit (also known as a wave guide) for modulated light waves to transmit information. These systems typically include a light emitter or a light detector optically connected to the optical fibers. A typical light emitter may be a so-called edge emitter, or a surface emitter, such as a vertical cavity surface emitting laser (VCSEL). A typical light detector may be a photodiode. A generic term of either a light emitter or a light detector is an "optoelectronic transducer." The optical fibers, which collectively form a fiber-optic cable or ribbon, are typically coupled to the respective light detector and the light emitter, so that optical signals can be transmitted back and forth, for example.

As an example, optoelectronic transducers convert electrical signals to or from the optical signals; the optical signals carry data to a receiver (light detector) from a transmitter (light emitter) via the fiber-optic ribbon at very high speeds. Typically, the optical signals are converted into, or converted from, the associated electrical signals using known circuitry. Such optoelectronic transducers are often used in devices, such as computers, in which data must be transmitted at high rates of speed.

The conventional light emitter allows for integrated two-dimensional array configurations. For example, the active regions (i.e., the region that transmits or receives the optical signals) of a conventional VCSEL can be arranged in a linear array, for instance 12 active regions spaced about 250 microns apart, or in area arrays, for example, 16×16 arrays or 8×8 arrays. Of course, other arrangements of the arrays are also possible. Nevertheless, linear arrays are typically considered to be preferable for use with optoelectronic transducers, since it is generally considered easier to align the optical fibers that collect the light emitted from the VCSELs in a linear array, than in an area array. Moreover, it is also possible to utilize the active regions singly, i.e., without being arranged in an array.

The optoelectronic transducers are normally located on either input/output cards or port cards that are connected to an input/output card. Moreover, in a computer system, for example, the input/output card (with the optoelectronic transducer attached thereto) is typically connected to a circuit board, for example a mother board. The assembly may then be positioned within a chassis, which is a frame fixed within a computer housing. The chassis serves to hold the assembly within the computer housing.

Typically, each optical fiber of the fiber-optic ribbon is associated with a respective active region. Further, it is conventional for the ends of the optical fibers of the fiber-optic ribbon to terminate in a fiber connector. Such fiber connectors usually have an industry standard configuration, such as the MTP® fiber connectors manufactured by US Conec, Ltd. of Hickory, N.C. However, fiber connectors having the industry standard configuration are not suitable for connecting directly with the sensitive active regions of the typical light emitters or light detectors. Should direct contact occur between the respective active regions and the fiber connector, the fiber connector would likely damage the active regions, causing the light emitter or light detector to become inoperative. It is thus conventional to space the fiber connector away from the active regions. However, as will be appreciated, by providing a space, it thus becomes desirable to provide a way of optically coupling the active regions with the spaced apart fiber connector, so that the optical signals can be accurately and efficiently transmitted therebetween.

One conventional manner of optically coupling the active regions with the fiber connector is to provide a lens assembly in the space therebetween. However, lens assemblies tend to be complicated and expensive. Thus, it is also known to provide a fiber optic coupler between the active regions and the fiber connector. However, the conventional fiber optic coupler has a limited length, due to manufacturing constraints. Thus, the known fiber connectors must be positioned relatively close to the active regions, which may limit design options.

Moreover, it is important to ensure that most of the light emitted from the active regions of the light emitter reaches the respective optical fibers, and that most of the light emitted from the optical fibers reaches the respective active regions of the light detector. It is thus desirable to ensure that the fiber optic coupler is precisely aligned with the respective active regions and the fiber ends disposed within the fiber connector.

It is also known to dispose the optical coupler within a housing, which is adapted to receive the optical connector in a manner that automatically aligns the optical fibers terminating at the optical connector with the optical coupler. The housing also allows the optical coupler to be fixed relative to the light emitter and/or light detector. That is, after the optical coupler is aligned with the respective active regions, the optical coupler may be fixed to the housing using a bonding agent, for example. However, the application of the bonding agent requires further steps during the manufacturing of the arrangement, thus increasing assembly time. Moreover, the bonding agent could inadvertently be applied to the optical face of the optical coupler, or to the active regions, thus damaging the assembly.

Thus, there is a need for an optical coupler/housing arrangement that allows the optical coupler to be fixed relative to the housing without requiring an extra bonding step, or a separate bonding agent.

Furthermore, the conventional optical coupler is typically freely positionable within the housing, prior to the application of the conventional bonding agent. For example, the housing may be provided with a channel, with the optical coupler being disposed in the channel. In order to ensure that the optical coupler can be positioned within the housing, the outer periphery of the optical coupler is made slightly smaller than an inner periphery of the channel, so that the optical coupler fits within the channel with a clearance fit. However, it must also be ensured that when the optical connector is connected to the housing, the optical coupler is aligned with the optical fibers that terminate at the optical connector. Thus, both the channel within the housing, and the optical coupler must be manufactured using relatively strict tolerances. That is, if the optical coupler is made as large as the tolerances allow, and the channel is made as narrow as the tolerances allow, the optical coupler must still be capable of fitting within the channel with a clearance fit. Moreover, once received within the channel, there cannot be too much free play, or the optical coupler may not be properly aligned with the optical fibers terminating at the optical connector. Manufacturing these components while maintaining the required tolerances is expensive and time consuming. Thus, there is a need for an optical coupler and housing arrangement that can be manufactured without regard to the tolerances discussed above.

SUMMARY OF THE INVENTION

It is, therefore, a principle object of this invention to provide an integrated optical coupler and housing arrangement.

It is another object of the invention to provide an integrated optical coupler and housing arrangement that solves the above mentioned problems.

These and other objects of the present invention are accomplished by the integrated optical coupler and housing arrangement disclosed herein.

According to one aspect of the invention, the integrated optical coupler and housing arrangement includes an optical coupler portion. The optical coupler portion optically couples active regions of a light emitter die chip or light detector die chip with the fibers within a fiber optic connector (i.e., an industry standard connector attched to an end of an optical fiber ribbon), so that the optical signals can be accurately and efficiently transmitted therebetween.

The integrated optical coupler and housing arrangement further includes a housing portion that has a recess for receiving the fiber optic connector, and which is adapted to selectively receive either the MPO or MTP industry standard connector, for example. A back surface of the recess is defined by an end surface of the optical coupler portion. Thus, when the fiber optic connector is received within the recess, the optical fibers of the optical coupler portion will be positioned adjacent to the fiber optic connector.

The housing portion may also be provided with a pair of latching fingers disposed on opposite sides of the recess. The latching fingers are adapted to engage with the fiber optic connector, to hold the connector in place.

In an exemplary aspect of the invention, the housing portion and the optical coupler portion are formed from a filled polymer, i.e., a polymer that includes a glass filler. In an exemplary aspect of the invention, the polymer has a glass content of about 30%. This content has proven to be particularly suitable when manufacturing the housing portion and the optical coupler portion using the molding techniques discussed in the following paragraphs.

In particular, in an exemplary aspect of the invention, the housing portion and the optical coupler portion are manufactured using an injection molding technique. The optical coupler portion, if injection molded, can be made to have any desired length. That is, the optical fibers, of any desired length, may be prearranged in their desired locations, and then the filled polymer would be injected around the fibers to form the optical coupler portion. This exemplary procedure is further advantageous in that, since the optical fibers do not need to be inserted within holes preformed in the optical coupler, the optical fibers will not be subjected to damage during such a procedure. Moreover, because the injection molding procedure also inherently fixes the optical fibers in their desired locations, there is no need for a separate bonding procedure to fix the optical fibers in place. Additionally, since a separate bonding agent is not needed to fix the optical fibers within the optical coupler portion, there is a reduced risk of the optical fibers being damaged due to the boding agent inadvertently contacting the optical fibers or other components.

This exemplary aspect of the invention also eliminates the need for a subsequent polishing step to the end faces of the optical fibers. That is, if the optical fibers are inserted within the holes of an optical coupler, the end faces would subsequently need to be polished, so as to remove any scratches or contaminates that may have formed on the end faces during the insertion procedure, and to ensure that all of the end faces are disposed in essentially the same plane and at essentially the same relative angle. However, when the optical fiber portion is formed by injection molding, the end faces of the optical fibers are not subjected to treatment after assembly that may cause damage thereto. Moreover, the end faces can be prealigned, so that even after the formation of the optical fiber portion, the end faces are in their desired aligned orientation.

The exemplary described technique used for forming the optical coupler portion can also be used to simultaneously form the housing portion, so that the optical coupler portion and the housing portion are integrally formed. This reduces the number of separate components that must otherwise be formed. Further, this technique eliminates the need to manufacture the mating surfaces of the housing and optical coupler using exacting tolerances, thus speeding up production. Additionally, this procedure eliminates the need to separately adhere the optical coupler to the housing, thus reducing the number of manufacturing steps, and reducing the risk of contamination to the components from bonding agents.

In another exemplary aspect of the invention, the housing portion and fingers are molded to have a one-piece configuration. This reduces assembly time by eliminating the need to fix separate latching fingers to the housing, and reduces inventory by eliminating multiple parts.

In another exemplary aspect of the invention, the integrated optical coupler and housing arrangement can include first and second housing portions disposed side-by-side, each of which has an optical coupler portion integrally formed therewith. This configuration allows both a light emitter and a light detector, for example, to be disposed in the same assembly, therefore saving circuit board space. The respective housings can be manufactured separately and joined together, for example, or the two housings can be integrally molded together.

In another exemplarily aspect of the invention, the front end of the integrated optical coupler and housing arrangement may also be provided with an electromagnetic interference shield. The electromagnetic interference shield is preferably formed from a conductive, non-corrosive material, such as steel having a tin plating. However, the electromagnetic interference shield can be formed of any material that will attenuate electromagnetic interference.

The electromagnetic interference shield may be hollow, to allow the shield to be slipped over the front end of the integrated optical coupler and housing arrangement. When properly positioned, the edge of the electromagnetic interference shield will be positioned essentially flush with the front end of the housing portion. The shield may be provided with inwardly projecting fingers that engage with the surface of the housing portion, to hold the shield in place.

In another exemplary aspect of the invention, the electromagnetic interference shield is provided with a number of conductive grounding springs, which are disposed around the outer periphery of an end of the shield. The grounding springs engage, for example, with a tailstock attached to a system frame of a computer, for example, to conductively couple the electromagnetic interference shield to a ground potential. When properly positioned, the grounding springs hold the electromagnetic interference shield in a fixed position relative to the tailstock.

The shield can advantageously be used to hold the first and second housing portions together, when two separate housing portions are provided. That is, the shield can be slid around the adjacent housing portions, and serve as a clamp to retain the housing portions in their relative positions.

In an exemplary aspect of the invention, the integrated optical coupler and housing arrangement forms a component of an optical transceiver arrangement that includes a plurality of other interconnected subassemblies.

One of the subassemblies of the optical transceiver arrangement is a carrier assembly. The carrier assembly includes a die carrier for carrying a die chip, having opposing lands. The opposing lands have a receiving space therebetween, in which either a light emitter die chip or light detector die chip (hereinafter referred to collectively as a die chip) is disposed.

The carrier is preferably manufactured from a conductive material, so that it can serve as a ground for the die chip. For example, the carrier can be formed from copper, and be gold plated to enhance its conductivity and reduce its susceptibility to oxidation.

The carrier further has spaced apart feet, which can be attached to a further subassembly of the optical transceiver arrangement, as will be subsequently described. The feet provide a space under the carrier in which other components can be disposed.

The lands are adapted to allow an optical coupler to be attached thereto. For example, each land can be provided with a receiving hole, which receives a corresponding alignment pin of the optical coupler in a clearance type fit.

In another exemplary aspect of the invention, an epoxy, for example, can be used to seal the exterior edges of the optical coupler portion to the surface of the die chip. The epoxy may have a sufficiently high viscosity so as to prevent the epoxy from flowing into the gap between the front edge of the optical coupler portion and the active regions of the die chip. Thus, a sealed air gap will be formed between the ends of the optical fibers in the optical coupler portion and the active regions to allow for the efficient transmission of light, while preventing contaminants from entering this space.

In a further exemplary aspect of the invention, the carrier assembly includes a flex cable that is electrically coupled to the die chip. The flex cable has both ground wires (or a ground layer) and signal wires which may be covered by an insulating coating, such as plastic. The insulating coating may be removed in a region at one end of the flex cable, to form one or more windows which expose the signal wires, grounds wires or both as they pass through the space of the windows. For example, if the flex cable is provided with two windows, one disposed over the other, the lower window can be adapted to expose the ground wires, to allow the ground wires to be electrically coupled to the conductive carrier. The upper window can then be adapted to expose the signal wires, which can then be electrically coupled to the die chip. This arrangement works well when the die chip is attached and directly grounded to the carrier.

Alternatively, if the die chip is not directly grounded to the carrier, then the flex cable can be provided with only one window, which is adapted to expose both the ground wires and the signal wires. These can then be electrically coupled to the die chip, for example a light detector die chip, to provide both a signal path and a return ground path.

Another end of the flex cable may be provided with a conductive plate, such as a metal stiffener, electrically bonded to the ground wires/ground layer of the flex cable. This conductive plate can then be attached to a ground potential, in a manner that will be subsequently described.

In use, the flex cable may be arranged to extend down the front of the carrier (i.e., on the side the die chip is disposed), and then flexed and bent to pass between the feet of the carrier and through the space therebetween. Thus, the conductive plate will then be disposed in a region behind the carrier.

In a further exemplary aspect of the invention, the optical transceiver arrangement further includes a laminate assembly. The laminate assembly includes a printed circuit board or wiring board, that has a plurality of superposed, alternating conductive layers and insulating layers formed in discrete planes. A front surface of the wiring board may have various electronic components, such as a light emitter driver chip and/or light detector driver chip, attached thereto, and may have electrically conductive pathways or wirings (also known as traces) between the components. The driver chips may be positioned so that in the final optical transceiver arrangement, the driver chips are positioned away from the carrier to aid in heat dissipation.

The wiring board can be adapted to allow it to be attached to a further printed circuit board, for example, by an end user. By way of example, the lower surface of the wiring board can be provided with a plurality of conductive pads arranged in an array, each of which is coupled to a ground plane, power plane and wiring plane of the board, using vias, for example, and each of which may be attached to a respective lead of the further printed circuit board using ball grid array (BGA) technology.

The laminate assembly may further include a polymer coating disposed on the upper surface of the wiring board, and upon which the housing portion can be disposed. The polymer coating may be relatively thick, and formed to provide locating features to facilitate the positioning of the various other subassemblies. For example, the housing portion may be provided with one or more projecting pins on a lower surface thereof, and the polymer coating may be provided with receiving holes that accommodate the respective projecting pins. Thus, during manufacturing, the housing portion can be quickly located on the laminate assembly in the desired location. Moreover, the coating protects the wirings and components on the surface of the wiring board, and helps to distribute heat generated by the drivers over a larger surface area.

Moreover, the polymer coating may be provided with one or more recesses formed therein, to expose respective conductive pads that are electrically coupled to the ground plane. The feet of the carrier can then be electrically bonded, using an electrical epoxy for example, to the conductive pads so that the carrier is electrically coupled to the ground plane. Moreover, the conductive plate of the flex cable may be electrically bonded to another conductive pad, to provide another means of electrically coupling the ground plane to the die chip and carrier. Further, the signal wires of the flex cable may be coupled, for example wire bonded, to respective signal traces on the surface of the laminate. Thereafter, the various electrical connections can be coated to protect the connections and wires from being damaged. For example, the coating can be a socalled chip coat epoxy material.

During the coupling of the flex cable to the laminate assembly, the housing portion may also be fixed to the laminate assembly. For example, the housing portion may be epoxied to the laminate assembly.

In another exemplary aspect of the invention, the optical transceiver arrangement may include a heat sink cover disposed over the laminate assembly. In this exemplary aspect of the invention, the polymer coating may include a step arranged around an outer periphery thereof, and the heat sink cover may have a flange that engages with the step to position the heat sink cover relative to the laminate assembly. Once in position, the heat sink cover can transfer and dissipate heat generated by the drivers, for example.

The heat sink cover may also be provided with a downwardly-projecting finger that is adapted to engage with an exposed conductive pad of the wiring board, which is coupled with the ground plane. In this manner, when the heat sink cover is in position, the heat sink cover will be electrically coupled with a ground potential, allowing the heat sink cover to serve as a further ground potential for the light emitter/light detector. Moreover, the downwardly-projecting finger can be positioned to extend between adjacent housing portions (when so provided), and in particular between the respective light emitter and light detector when so provided, to serve as an electromagnetic emissions separator. Thus, the heat sink cover can help prevent electromagnetic interference from occurring between the light emitter and light detector.

When properly positioned, the heat sink cover may be bonded in place, for example using an epoxy, and may be positioned to abut against a back of the retainer assembly.

The present invention results in an optical transceiver arrangement in which various delicate components are sealed and protected. Moreover, the thermal characteristics are optimized, resulting in increased efficiency. Further, optical clarity is enhanced and the resulting structure can be easily assembled and used in small spaces. Further, the arrangement allows for both a transmitter and detector in the same package. Additionally, this arrangement allows MPO and MTP optical connectors to be selectively attached thereto. Further, the resulting optical transceiver arrangement has fewer parts, thus reducing inventory and reducing manufacturing time. Moreover, due to the elimination of a separate optical coupler, the reliability of the resulting structure is enhanced, since the optical coupler portion cannot shift or become separated from the housing portion, or become damaged during assembly.

BRIEF DESCRIPTION OF THE DRAWINGS

FIG. 1 is a rear perspective view of an integrated optical coupler and housing arrangement, according to an exemplary aspect of the invention.

FIGS. 2 and 3 are sectional views of the integrated optical coupler and housing arrangement shown in FIG. 1.

FIG. 10 is a perspective view of the optical transceiver arrangement having the shield shown in FIG. 9 attached thereto, according to an exemplary aspect of the invention.

FIG. 11 is a perspective view of the optical transceiver arrangement shown in FIG. 10, disposed within a computer.

FIG. 12 is an elevational view of a carrier subassembly of the optical transceiver arrangement.

FIG. 13 is a perspective view of the carrier subassembly of the optical transceiver arrangement.

DETAILED DESCRIPTION OF THE PREFERRED EMBODIMENTS

Figure 5:
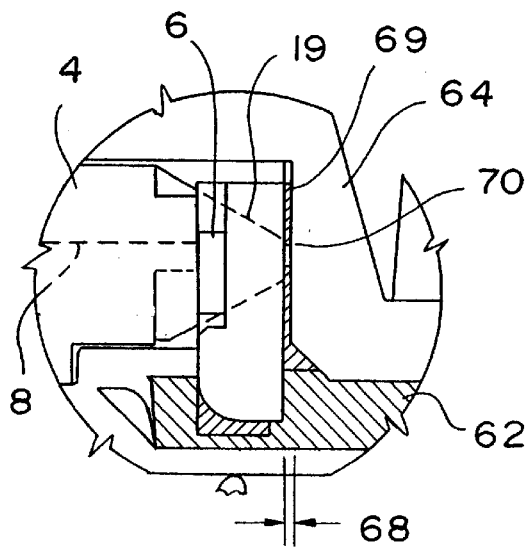
FIG. 5 is an enlarged view of a portion of the sectional view shown in FIG. 4.

The invention will now be described in more detail by way of example with reference to the embodiments shown in the accompanying figures. It should be kept in mind that the following described embodiments are only presented by way of example and should not be construed as limiting the inventive concept to any particular physical configuration.

Further, in the application, the terms "upper", "lower", "front", "back", "over", "under", and similar such terms are not to be construed as limiting the invention to a particular orientation. Instead, these terms are used only on a relative basis.

Referring to FIGS. 1–3, the present invention is directed toward an integrated optical coupler and housing arrangement 2, which includes an optical coupler portion 4. The optical coupler portion 4 optically couples active regions of a light emitter die chip is 6 or light detector die chip 6 (see FIGS. 4 and 5, and hereinafter referred to collectively as a die chip 6) with the fibers of a spaced apart fiber optic connector (not shown), such as an industry standard MPO/MTP connector, so that the optical signals can be accurately and efficiently transmitted therebetween.

The optical coupler portion 4 has two opposing end surfaces 7, 7', one of which faces toward the active regions, and the other of which faces toward the fiber optic connector. The optical coupler portion 4 further includes a plurality of spaced apart optical fibers 8, each of which extends from the one end surface 7 to the other end surface 7'. The optical fibers 8 are used to transmit optical signals between the fiber optic connector and the active regions. The optical fibers terminate in a region of the respective end surfaces; however, they may extend slightly beyond the end surfaces.

The integrated optical coupler and housing arrangement 2 further includes a housing portion 10 that has a recess 12 for receiving the fiber optic connector, and which is adapted to selectively receive either the MPO or MTP connector, for example. A back surface of the recess 12 is defined by the end surface 7' of the optical coupler portion 4. Thus, when the fiber optic connector is received within the recess 12, the optical fibers 8 of the optical coupler portion 4 will be positioned adjacent to the fiber optic connector.

Figure 6:
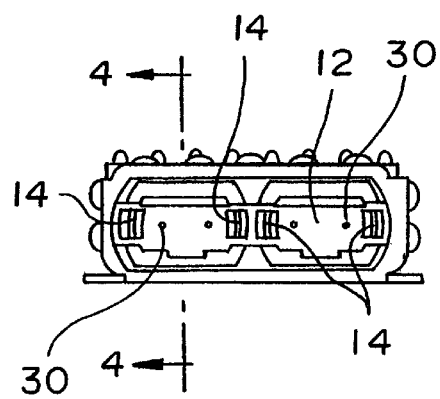
FIG. 6 is a front elevational view of the optical transceiver arrangement.
Figure 7:
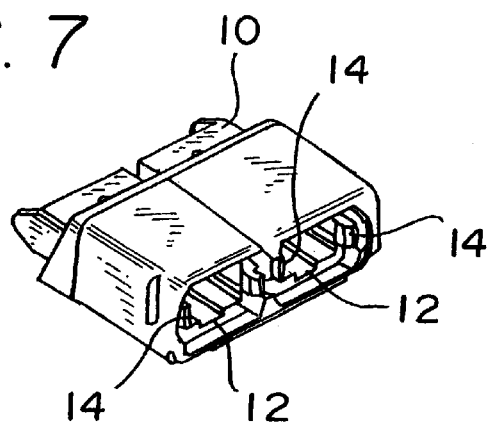
FIG. 7 is a perspective front view of the integrated optical coupler and housing arrangement, according to an exemplary aspect of the invention.

As best shown in FIGS. 6 and 7, the housing portion 10 may also be provided with a pair of latching fingers 14 disposed on opposite sides of the recess 12. The latching fingers 14 are adapted to engage with the fiber optic connector, to hold the connector in place.

Figure 8:
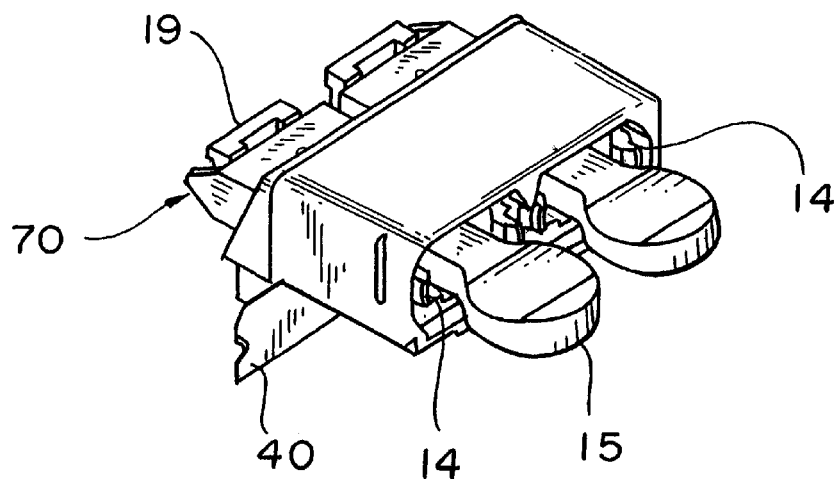
FIG. 8 is a perspective view of a portion of the optical transceiver arrangement shown in FIG. 4.

Moreover, and as shown in FIG. 8, when not attached to the fiber optic connector, a plug 15 can be inserted in the recess 12 and retained therein by the latching fingers 14. The plug 15 prevents contaminants from entering the integrated optical coupler and housing arrangement 2, when the arrangement is not in use.

In an exemplary aspect of the invention, the housing portion 10 and the optical coupler portion 4 are formed from a filled polymer, i.e., a polymer that includes a glass filler. In an exemplary aspect of the invention, the polymer has a glass content of about 30%. This content has proven to be particularly advantageous when manufacturing the housing portion 10 and the optical coupler portion 4 using the molding techniques discussed in the following paragraphs.

In particular, in an exemplary aspect of the invention, the housing portion 10 and the optical coupler portion 4 are manufactured using an injection molding technique. The specifics of injection molding are well known to those skilled in the art, from other fields of endeavor, and will not be discussed in detail. However, the use of other manufacturing techniques, such as transform molding, may limit the maximum size of the optical coupler to about 6 millimeters in length. One reason for this limitation is that when an optical coupler is manufactured using transform molding techniques, small through holes for receiving the optical fibers must be molded into the optical coupler. After the optical coupler and holes are formed, the optical fibers are individually inserted into the holes, and adhered into place. However, current technology only allows holes of such a small diameter to be accurately formed to a maximum length of about 6 mm. This relatively short length limits the design options when using such an optical coupler. Moreover, the insertion of the optical fibers into the holes can cause the end faces of the optical fibers to become damaged, thus requiring that the end faces of the optical fibers be subjected to a subsequent polishing step. Further, the adhering of the optical fibers into the respective holes requires yet a further operation to perform this task, and increases the risk that the optical fibers (or other components) will become contaminated by the bonding agent On the other hand, the optical coupler portion 4 according to the present invention, if injection molded, can be made to have any desired length. That is, when injection molded, the optical fibers 8 are first prearranged in their desired locations, and then the filled polymer is injected around the fibers to form the optical coupler portion 4. Thus, whereas the conventional manufacturing techniques limited the size of the optical coupler by the length of the hole, injection molding allows the optical coupler portion to have any desired length, including lengths greater than 6 millimeters, since individual holes for the optical fibers need not be formed.

This procedure is further advantageous in that, since the optical fibers 8 do not need to be inserted within holes preformed in the optical coupler, the optical fibers will not be subjected to damage during such a procedure. Moreover, because the injection molding procedure also inherently fixes the optical fibers 8 in their desired locations, there is no need for a separate bonding procedure to fix the optical fibers in place. Additionally, since a separate bonding agent is not needed to fix the optical fibers within the optical coupler portion 4, there is a reduced risk of the optical fibers being damaged due to the bonding agent inadvertently contacting the optical fibers or other components.

This exemplary aspect of the invention also eliminates the need for a subsequent polishing step to the end faces of the optical fibers. That is, if the optical fibers are inserted within the holes of an optical coupler, the end faces will subsequently require polishing, so as to remove any scratches or contaminates that may have formed on the end faces during the insertion procedure, and to ensure that all of the end faces are disposed in essentially the same plane and at essentially the same relative angle. However, when the optical fiber portion is formed by injection molding, the end faces of the optical fibers are not subjected to treatment that may cause damage thereto. Moreover, the end faces can be prealigned, so that immediately after the formation of the optical fiber portion, the end faces are in their desired aligned orientation.

Prior to the present invention, it was not believed to be advantageous to form a housing and an optical coupler in an integral arrangement. That is, it was conventionally believed that the end faces of the fibers of the optical coupler required polishing after their insertion within the holes. However, this polishing could only be economically performed if the optical coupler were separate from the housing.

However, the exemplary described technique used for forming the optical coupler portion 4 can also be used to simultaneously form the housing portion 10, so that the optical coupler portion and the housing portion are integrally formed. In the context of the present application, "integrally formed" is meant that there is no set or defined boundary (i.e., transition) between the optical coupler portion and the housing portion, as there would be if an optical coupler were adhered within a housing. Instead, the optical coupler portion is formed with the housing portion, so that these two features are inseparable, and incapable at any time of existing on their own.

This aspect of the invention reduces the number of separate components that must otherwise be formed. Further, this technique eliminates the need to manufacture the mating surfaces of the housing and optical coupler using exacting tolerances, thus speeding up production. Additionally, this procedure eliminates the need to separately adhere the optical coupler to the housing, thus reducing the number of manufacturing steps, and reducing the risk of contamination to the components from bonding agents. Moreover, this aspect of the invention ensures that the optical coupler cannot inadvertently become separated from, or shift relative to the housing portion.

In another exemplary aspect of the invention, the housing portion 10 and latching fingers 14 are preferably molded to have a one-piece configuration (i.e., integrally formed). This reduces assembly time by eliminating the need to fix separate latching fingers 14 to the housing, and reduces inventory by eliminating multiple parts.

In another exemplary aspect of the invention, the integrated optical coupler and housing arrangement 2 can include first and second housing portions 10 disposed side-by-side, each of which has an optical coupler portion 4 integrally formed therewith. This configuration allows both a light emitter and a light detector, for example, to be disposed in the same assembly, therefore saving circuit board space. The respective housing portions can be manufactured separately and joined together, for example, or the two housing portions can be integrally molded together.

Figure 9:
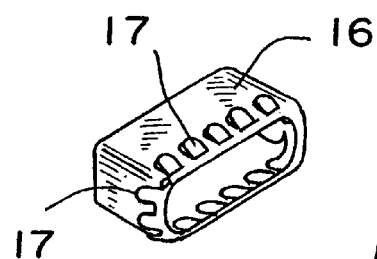
FIG. 9 is a perspective view of an EMI shield of the optical transceiver arrangement.
Figures 14, 15:
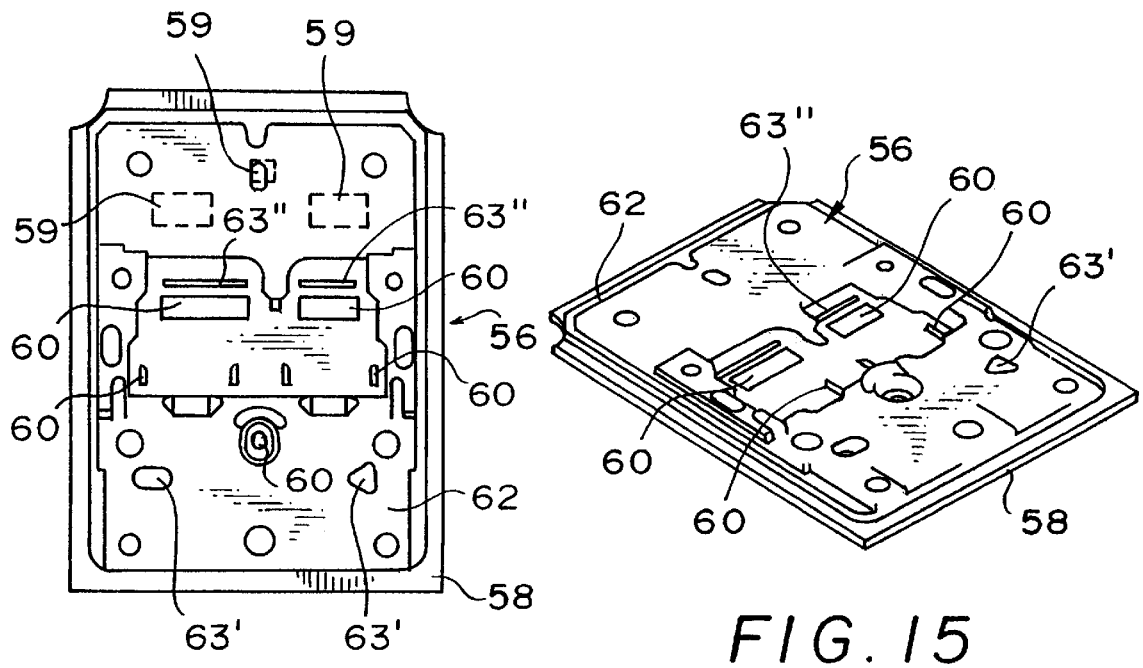
FIGS. 14 and 15 are various views of a laminate subassembly of the optical transceiver arrangement shown in FIG. 10.
Figure 17:
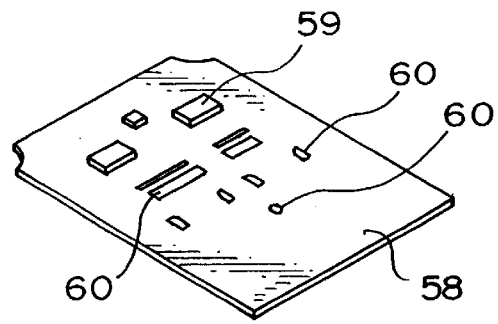
FIGS. 16 and 17 are various views of the wiring board of the laminate subassembly shown in FIGS. 14 and 15.
Figure 16:
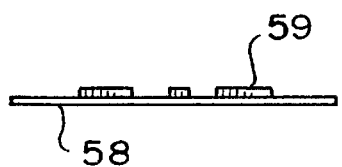

Referring also to FIGS. 9 and 10, the front end of the integrated optical coupler and housing arrangement 2 may also be provided with an electromagnetic interference shield 16. The electromagnetic interference shield 16 is preferably formed from a conductive, non-corrosive material, such as steel having a tin plating. However, the electromagnetic interference shield 16 can be formed of any material that will attenuate electromagnetic interference.

As shown, the electromagnetic interference shield 16 is hollow, to allow the shield 16 to be slipped over the front end of the integrated optical coupler and housing arrangement 2. When properly positioned, the edge of the electromagnetic interference shield 16 will be positioned essentially flush with the front end of the housing portion 10. The shield 16 may be provided with inwardly projecting fingers 16' that engage with the surface of the housing portion 10, to hold the shield 16 in place.

Preferably, the electromagnetic interference shield 16 is provided with a number of conductive grounding springs 17, which are disposed around the outer periphery of an end of the shield 16. As shown in FIG. 11, the grounding springs 17 engage, for example, with a tailstock 17' attached to a system frame 17" of a computer, for example, to conductively couple the electromagnetic interference shield 16 to a ground potential. When properly positioned, the grounding springs 17 hold the electromagnetic interference shield 16 in a fixed position relative to the tailstock 17'.

By way of example, the grounding springs 17 can be formed as metal fingers which extend in the same plane, and contiguous with, a respective wall of the shield 16. The metal fingers can then be bent so that the fingers are disposed essentially superposed to the respective walls they are attached to. However, due to the memory effect of the material, the fingers will exert a spring force that acts in a direction away from the walls. Thus, the metal fingers can engage with the tailstock, in the aforementioned manner.

In the illustrated exemplary embodiment, the shield 16 can be used to hold the first and second housing portions 10 together, when two separate housing portions are provided. That is, the shield 16 can be slid around the adjacent housing portions 10, and serve as a clamp to retain the housing portions in their relative positions.

In an exemplary aspect of the invention, the integrated optical coupler and housing arrangement 2 forms a component of an optical transceiver arrangement 18 that includes a plurality of other interconnected subassemblies, the details of which will be described in the paragraphs that follow.

For example, one of the subassemblies of the optical transceiver arrangement 18 is a carrier assembly. As best shown in FIGS. 12 and 13, the carrier assembly includes a die carrier 19, having opposing lands 20. In the exemplary illustrated embodiment, the opposing lands 20 have a receiving space therebetween, in which either the light emitter die chip 6 or the light detector die chip is disposed.

The carrier 19 may be manufactured from a conductive material, so that it can serve as a ground for the die chip 6. For example, the carrier 19 can be formed from copper, and be gold plated to enhance its conductivity and reduce its susceptibility to oxidation. However, it is contemplated that the carrier 19 can be manufactured from other materials without departing from the spirit and scope of the invention.

In another exemplary aspect of the invention, the carrier 19 has spaced apart feet 24, which can be attached to a further subassembly of the optical transceiver arrangement, as will be subsequently described. The feet 24 provide a space under the carrier 19 in which other components can be disposed. Moreover, the feet 24 are shown as being in registration with the lands 20. However, variations in the relative placement of the feet 24 and lands 20 are within the scope of the invention.

The lands 20 are adapted to allow the optical coupler portion 4 to be attached thereto. For example, each land 20 can be provided with a receiving and alignment hole 28. Further, each opposing end surface 7, 7' of the optical coupler portion 4 may have an alignment pin or pins 30 that projects therefrom (see FIG. 1). In the illustrated exemplary embodiment, each end surface 7, 7' has a pair of alignment pins 30 disposed to flank the optical fibers 8. The alignment pins 30 on one end surface 7 are received within corresponding receiving and alignment holes 28, to align and fix the optical coupler portion 4 to the die carrier 19. The alignment pins 30 on the other end surface (see FIG. 6) are insertable within corresponding holes formed in the fiber optic connector, to align and fix the optical coupler portion 4 to the fiber optic connector.

In the exemplary illustrated aspect of the invention, the lands 20 are adapted to project out beyond the die chip 6. This configuration prevents the optical coupler portion 4 from having direct contact with the active regions (i.e., the regions that emit or detect the light) of the die chip 6.

The optical fibers 8 of the optical coupler portion 4 may be actively aligned with the active regions, so as to ensure that the emitted light does not partially or completely "miss" its intended target. By way of example, with the alignment pins 30 received with a clearance fit in the respective receiving and alignment holes 28, and with a 12-channel light emitter (i.e., a light emitter having 12 active regions), the light emitter may be turned on (activated). The first optical fiber of the optical coupler could then be aligned, in both an x- and a y-direction, with the center of the first channel. The optical coupler portion 4 could then be rotated about the z-axis of the first channel, until the maximum output of the twelfth channel is ascertained. Thereafter, a UV curable adhesive, for example, could be used to fix the respective alignment pins 30 in the respective receiving and alignment holes 28 in the lands 20, thereby locking the optical coupler portion 4 in alignment with the active regions of the die chip 6.

After alignment, an epoxy, for example, can be used to seal the exterior edges of the optical coupler portion 4 to the surface of the die chip 6. The epoxy may have a sufficiently high viscosity so as to prevent the epoxy from flowing into the gap between the front edge of the optical coupler portion and the active regions of the die chip 6. Thus, a sealed air gap will be formed between the ends of the optical fibers 8 in the optical coupler portion 4 and the active regions to allow for the efficient transmission of light, while preventing contaminants from entering this space.

In a further exemplary aspect of the invention, the carrier assembly includes a flex cable 40 that is electrically coupled to the die chip 6. In the exemplary illustrated embodiment, the flex cable 40 has a ground layer (hereinafter referred to as ground wires) and signal wires (shown in hidden lines, and referenced as 41 in Figure) which may be covered by an insulating coating 41', such as plastic. The insulating coating 41' may be removed in a region at one end of the flex cable 40, to form one or more windows 42 which expose the signal wires, grounds wires, or both as they pass through the space of the windows 42. For example, if the flex cable 40 is provided with two windows 42, one disposed over the other (not shown), the lower window can be adapted to expose the ground wires, so that the exposed ground wires may be electrically coupled to the conductive carrier 19. The upper window can then be adapted to expose the signal wires, which can then be electrically coupled to the die chip 6. This arrangement works well when the die chip 6 is attached and directly grounded to the carrier 19. For example, the back of the light emitter die chip 6 may be bonded to the carrier 19 using an electrically-conductive epoxy, so that the light emitter die chip 6 is grounded directly to the conductive carrier 19. Alternatively, if the die chip 6 is not directly grounded to the carrier 19, then the flex cable 40 can be provided with only one window, which is adapted to expose both the ground wires and the signal wires. These can then be electrically coupled to the die chip 6, for example a light detector die chip 6, to provide both a signal path and a return ground path.

By way of example, the signal wires and the ground wires of the flex cable 40 may be electrically coupled to the carrier 19 and/or die chip 6 using a so-called tab bonding technique. Such a technique is well known to those skilled in the art, and includes using pressure, heat and vibrations to ultrasonically weld the components together. Moreover, a wire-bond conductive ball (not shown) may be used to couple the signal wires to the die chip 6. For example, the wire-bond ball may be connected to tab bonds of the die chip 6. The wire-bond ball may be coined down (i.e., flattened), to provide a smooth, flat surface to which the signal wires may be bonded. By bonding the signal wires to the wire-bond balls, as opposed to a surface of the die chip 6, the surface of the die chip 6 is protected against damage that may otherwise occur during the tab bonding technique. The tab bonds may then be covered with a chip-coat protective adhesive, for example, to protect the connection.

Another end of the flex cable 40 may be provided with a conductive plate 44, such as a metal stiffener plate, electrically bonded to the ground wires/ground plane of the flex cable 40. This conductive plate 44 can then be easily attached to a ground potential, in a manner that will be subsequently described.

In use, the flex cable 40 may be arranged to extend down the front of the carrier 19 (i.e., on the side the die chip 6 is disposed), and then flexed and bent to pass between the feet 24 of the carrier 19 and through the space therebetween. Thus, when in use, the conductive plate 44 will be disposed in a region behind the carrier 19.

Referring also to FIGS. 14–17, in a further exemplary aspect of the invention, the optical transceiver arrangement further includes a laminate assembly 56. The laminate assembly 56 includes a wiring board 58, that includes a plurality of superposed, alternating conductive layers and insulating layers formed in discrete planes. Although the individual layers are not separately shown, such arrangements are known to those skilled in the art. In the exemplary illustrated embodiment, the wiring board 58 is a relatively flat board having a front surface that has various electronic components 59, such as a light emitter driver chip and/or light detector driver chip attached thereto, and having electrically conductive pathways or wirings (also known as traces) between the respective components. Preferably, the driver chips are positioned so that in the completed optical transceiver arrangement, the driver chips are positioned away from the carrier 19 to aid in heat dissipation.

By way of example, the conductive layers may include one or more internal wiring planes (i.e., a set of wirings located in one plane), each of which includes a number of individual conductive wirings. As mentioned above, the wirings are used to interconnect the various electronic components 59 locatable on the wiring board together, and allow for the transmission of electrical signals.

Further, the conductive layers of the board 58 may also include one or more power planes and/or ground planes, which are typically sheets of conductive material, such as copper. The power plane is used to supply power from the wiring board 58 to the various electronic components 59 located on the wiring board, whereas the ground plane serves as a ground potential for the various electronic components 59. The power plane and the ground plane may be located in different planes from the wiring plane, or may be located in the same plane as a respective wiring plane.

Each of the conductive layers of the wiring board 58 may be separated from the other overlying and/or underlying conductive layers by a respective layer of insulating material. Moreover, the wiring board 58 may be provided with a number of plated mechanically-formed through holes and/or a number of plated mechanically-formed vias (i.e., blind holes formed in the insulating layers and plated or filled with a conductive material). Each plated via and plated through hole is electrically coupled to a respective conductive layer, and is used to transmit power or electrical signals, through respective insulating layers, to and from the associated electronic components 59 and/or between the respective conductive layers. Further, the vias, for example, can be used to interconnect the ground plane and wiring plane to respective conductive pads 60 formed on the surfaces of the wiring board 58.

The wiring board 58 can be adapted to allow its attachment to a further printed circuit board 61 (see FIG. 11), such as a backplane, for example, by an end user. By way of example, the lower surface of the wiring board 58 can be provided with a plurality of conductive pads 60 arranged in an array (not shown), each of which is coupled to the ground plane, power plane and/or wiring plane, using the vias, for example, and each of which may be attached to a respective lead of the printed circuit board 61 using ball grid array (BGA) technology, for example. Although not shown, such technology is well known to those skilled in the art.

Figure 18:
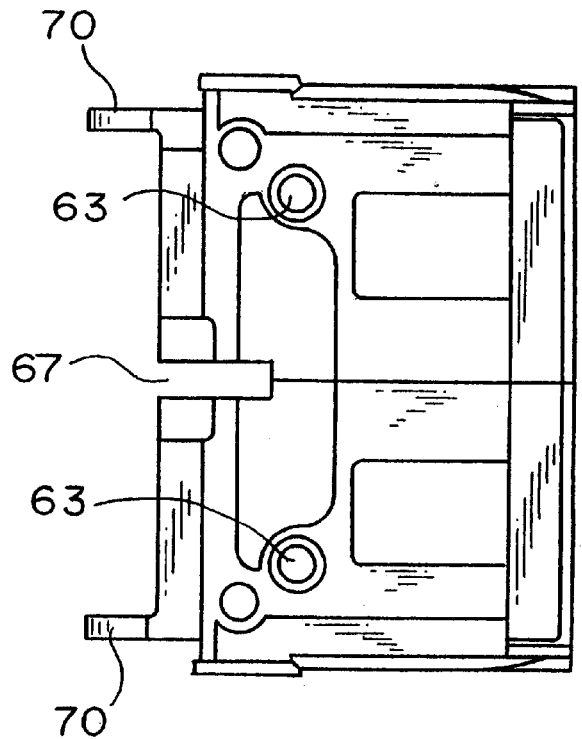
FIG. 18 is a bottom view of the housing portion of the integrated optical coupler and housing arrangement.

The laminate assembly 56 may also include a polymer, for example, coating 62 disposed on the upper surface of the wiring board 58, and upon which the housing portion 10 can be disposed. The polymer coating 62 may be relatively thick and formed to provide locating features to facilitate the positioning of the various other subassemblies. For example, the housing portion 10 may be provided with one or more projecting pins 63 on a lower surface thereof (see FIG. 18), and the polymer coating 62 may be provided with receiving holes 63' that accommodate the respective projecting pins 63. Thus, the integrated optical coupler and housing arrangement 2 can be quickly located on the laminate assembly 56 in a desired position. Moreover, the coating 62 protects the wirings and components on the surface of the wiring board 58, and helps to distribute heat generated by the drivers over a larger surface area.

Moreover, the polymer coating 62 may be provided with one or more recesses formed therein. In the illustrated exemplary embodiment, a relatively large recess may be formed in a central region of the coating 62, to expose signal and/or power traces 63″ that are coupled to the wiring plane and/or power plane, and to expose one or more conductive pads 60 that are electrically coupled to the ground plane. The feet 24 of the carrier 19 can then be electrically bonded, using an electrical epoxy for example, to the exposed conductive pads 60 electrically coupled to the ground plane, so that the carrier 19 is likewise electrically coupled to the ground plane. Moreover, the conductive plate 44 of the flex cable 40 may be electrically bonded to another conductive pad, to provide another means of electrically coupling the ground plane to die chip 6 and carrier 19. Further, the signal wires of the flex cable 40 may be coupled, for example wire bonded, to the respective signal and/or power traces 63″ on the surface of the wiring board 58. Thereafter, the various electrical connections can be coated to protect the connections and wires from being damaged. For example, the coating can be a so-called chip coat epoxy material.

During the coupling of the flex cable 40 to the wiring board 58, the housing portion 10 may also be fixed to the laminate assembly 56. For example, the housing portion 10 may be epoxied to the laminate assembly 56.

Figure 4:
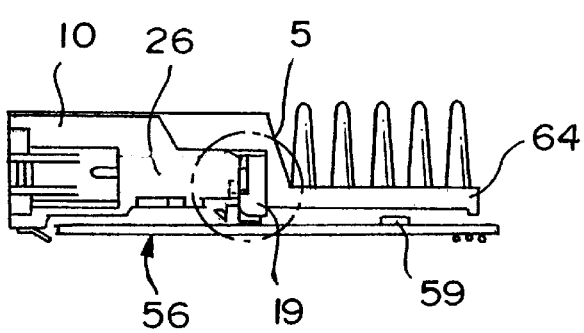
FIG. 4 is a partial sectional view of an optical transceiver arrangement, according to an exemplary aspect of the invention, taken along section lines 4—4 in FIG. 6.
Figure 19:
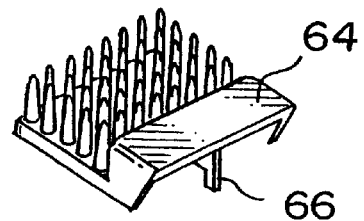
FIG. 19 is a perspective view of a heat sink cover of the optical transceiver arrangement shown in FIG. 10.

As shown in FIG. 19, the optical transceiver arrangement may also include a heat sink cover, which is disposed over the laminate assembly 56 (best shown in FIGS. 4 and 5). In this exemplary aspect of the invention, the polymer coating 62 includes a step arranged around an outer periphery thereof, and the heat sink cover 64 has a flange that engages with the step to position the heat sink cover relative to the laminate assembly 56. Once in position, the heat sink cover 64 can transfer and dissipate heat generated by the drivers, for example.

The heat sink cover 64 may also be formed from an electrically conductive material and be provided with a downwardly-projecting finger 66 that is adapted to engage with an exposed conductive pad 60 of the wiring board 58, which is coupled with the ground plane. In this manner, when the heat sink cover 64 is in position, the heat sink cover 64 will be electrically coupled with a ground potential, allowing the heat sink cover to serve as a further ground potential for the light emitter/light detector. Moreover, the downwardly-projecting finger 66 can be positioned to extend between he first and second housing portions 10, and between the respective light emitter and light detector (when so provided), to serve as an electromagnetic emissions separator. For example, the finger 66 can extend through the gap 67, as shown in FIG. 2. Thus, the heat sink cover 64 can help to prevent electromagnetic interference from occurring between the light emitter and the light detector.

Once properly positioned, and referring back to FIG. 5, the heat sink cover 64 is bonded in place, for example using an epoxy, and will preferably be positioned to abut against a back of the housing portion 10. Moreover, in an exemplary aspect of the invention, a gap 68 is present between the back of the carrier 19 and the heat sink cover 64, which is subsequently filled with a thermal epoxy 69. The thermal epoxy 69 provides for improved conductivity between the carrier 19 and the heat sink cover 64. This gap 68, which may be 0.005 inches, for example, can be established using ears 70 which project from a rear of the respective housing portions 10. The ears 70 abut against the heat sink cover 64 when the heat sink cover, carrier 19, housing portion 10 and laminate assembly 56 are all properly joined together.

The present invention results in an optical transceiver arrangement in which various delicate components are sealed and protected. Moreover, the thermal characteristics are optimized, resulting in increased efficiency. Further, optical clarity is enhanced and the resulting structure can be easily assembled and used in small spaces. Further, the arrangement allows for both a transmitter and detector in the same package. Additionally, this arrangement allows MPO and MTP optical connectors to be selectively attached thereto. Further, the resulting optical transceiver arrangement has fewer parts, thus reducing inventory and reducing manufacturing time. Moreover, due to the elimination of a separate optical coupler, the reliability of the resulting structure is enhanced, since the optical coupler portion cannot shift or become separated from the housing portion.

It should be understood, however, that the invention is not necessarily limited to the specific arrangement and components shown and described above, but may be susceptible to numerous variations within the scope of the invention.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes, and adaptations, and the same are intended to be comprehended within the meaning and range of equivalents of the appended claims.

What is claimed is:

1. An optical coupler and housing arrangement, comprising:

a housing portion adapted to receive an optical connector of a fiber optic cable; and an optical coupler portion integrally formed with said housing portion, said optical coupler portion being adapted to transmit optical signals to and from the fiber optic cable.

2. The optical coupler and housing arrangement recited in claim 1, wherein said optical coupler portion has opposing end surfaces, and a plurality of optical fibers for transmitting the optical signals, each of said optical fibers extending from one of said end surfaces to another one of said end surfaces.

3. The optical coupler and housing arrangement recited in claim 2, wherein each of said optical fibers terminates in a region of the respective end surfaces.

4. The optical coupler and housing arrangement recited in claim 3, wherein each of said optical fibers has a length that is greater than about 6 millimeters.

5. The optical coupler and housing arrangement recited in claim 2, wherein said optical coupler portion further comprises a first pair of alignment pins projecting from the one of said end surfaces and being disposed to flank opposing sides of said optical fibers, and a second pair of alignment pins projecting from the another one of said end surfaces and being disposed to flank the opposing sides of said optical fibers, said first pair of alignment pins being engageable with the optical connector when received by said housing portion, said second pair of alignment pins being engageable with a die carrier.

6. The optical coupler and housing arrangement recited in claim 2, wherein said housing portion has a recess for receiving the optical connector, the one of said end surfaces forming a back surface of the recess.

7. The optical coupler and housing arrangement recited in claim 6, wherein said housing portion further includes integrally formed latching fingers disposed on opposite sides of the recess and being adapted to engage with the optical connector to secure the optical connector within the recess.

8. The optical coupler and housing arrangement recited in claim 1, wherein said housing portion and said optical coupler portion are each comprised of a highly-filled polymer.

9. The optical coupler and housing arrangement recited in claim 1, wherein said housing portion comprises a first housing portion, and said optical coupler portion comprises a first optical coupler portion; further comprising a second housing portion adapted to receive a further optical connector; and a second optical coupler portion integrally formed with said second housing portion; said second housing portion being disposed adjacent to said first housing portion and connected thereto.

10. The optical coupler and housing arrangement recited in claim 9, wherein said second housing portion and said first housing portion are integrally formed together.

11. An optical transceiver arrangement, comprising:
an optical coupler and housing arrangement, including a housing portion adapted to receive an optical connector of a fiber optic cable; and an optical coupler portion integrally formed with said housing portion; and a carrier assembly having a carrier connected to said housing portion, and a die chip connected to said carrier, said die chip having at least one active region, said optical coupler portion being adapted to transmit optical signals between the fiber optic cable and the active region of said die chip.

12. The optical transceiver arrangement recited in claim 11, further comprising:
a laminate assembly having said carrier disposed thereon, said die chip being electrically coupled to said laminate assembly; and
a cover disposed over said laminate assembly and connected to said carrier.

13. The optical transceiver arrangement recited in claim 12, wherein said cover is a heat sink for transferring heat from said laminate assembly.

14. The optical transceiver arrangement recited in claim 12, further comprising a flex cable electrically coupling said die chip to said laminate assembly.

15. The optical transceiver arrangement recited in claim 14, wherein said laminate assembly includes a wiring board having a ground plane and at least one conductive pad disposed on a surface of said wiring board, said conductive pad being electrically coupled to said ground plane, said flex cable being electrically coupled to said conductive pad.

16. The optical transceiver arrangement recited in claim 15, wherein said laminate assembly includes a coating covering the surface of said wiring board, said coating having at least one recess formed therein that exposes said at least one conductive pad to allow said flex cable to be electrically coupled to said conductive pad.

17. The optical transceiver arrangement recited in claim 16, wherein said flex cable has a conductive plate in electrical contact with said at least one conductive pad, and having ground wires electrically coupled to at least one of said die chip and said carrier, said ground wires further being electrically coupled to said conductive plate.

18. The optical transceiver arrangement recited in claim 17, wherein said flex cable further has signal wires extending therethrough, and an insulating coating covering said signal wires and said ground wires, said insulating coating having at least one window formed therein to expose said signal wires and said ground wires, to allow said signal wires to be electrically coupled to said die chip, and to allow the ground wires to be electrically coupled to said at least one of said die chip and said carrier.

19. The optical transceiver arrangement recited in claim 14, wherein said carrier has first and second spaced apart feet, said flex cable extending between said spaced apart feet.

20. The optical transceiver arrangement recited in claim 12, wherein said laminate assembly includes a wiring board having a ground plane and at least one conductive pad disposed on a surface of said wiring board, said conductive pad being electrically coupled to said ground plane; and wherein said carrier has a foot electrically coupled to said at least one conductive pad.

21. The optical transceiver arrangement recited in claim 12, wherein said laminate assembly includes a wiring board and a coating covering the surface of said wiring board, said coating having a locating hole formed therein; and wherein said housing portion has a locating pin extending from a bottom thereof, said locating pin being received within the locating hole to position said housing portion relative to said laminate assembly.

22. The optical transceiver arrangement recited in claim 12, wherein said housing portion comprises a first housing portion, and said optical coupler portion comprises a first optical coupler portion; further comprising a second housing portion adapted to receive a further optical connector; and a second optical coupler portion integrally formed with said second housing portion; said second housing portion being disposed adjacent to said first housing portion and connected thereto; further comprising an electromagnetic interference shield disposed around said first housing portion and said second housing portion to retain said housing portions in a side-by-side relationship.

23. The optical transceiver arrangement recited in claim 22, wherein said laminate assembly includes a wiring board having a ground plane and at least one conductive pad disposed on a surface of said wiring board, said conductive pad being electrically coupled to said ground plane; wherein said cover is a heat sink for transferring heat from said laminate assembly; and wherein said cover has a downwardly-projecting finger that extends between said housing portions and engages with said conductive pad to provide for electromagnetic separation.

24. The optical transceiver arrangement recited in claim 11, further comprising an electromagnetic interference shield disposed around said housing portion.

25. The optical transceiver arrangement recited in claim 11, wherein said optical coupler portion has opposing end surfaces, and a plurality of optical fibers for transmitting the optical signals, each of said optical fibers extending from one of said end surfaces to another one of said end surfaces.

26. The optical transceiver arrangement recited in claim 25, wherein each of said optical fibers terminates in a region of the respective end surfaces.

27. The optical transceiver arrangement recited in claim 26, wherein each of said optical fibers has a length that is greater than about 6 millimeters.

28. The optical transceiver arrangement recited in claim 25, wherein said housing portion has a recess for receiving the optical connector, the one of said end surfaces forming a back surface of the recess.

29. The optical transceiver arrangement recited in claim 28, wherein said housing portion further includes integrally formed latching fingers disposed on opposite sides of the recess and being adapted to engage with the optical connector to secure the optical connector within the recess.

30. The optical transceiver arrangement recited in claim 11, wherein said housing portion and said optical coupler portion are each comprised of a highly-filled polymer.

31. The optical transceiver arrangement recited in claim 11, wherein said carrier has two spaced apart lands, said die chip being disposed between said lands, said optical coupler portion being fixed to said lands so as to be positioned in front of said active region.

32. The optical transceiver arrangement recited in claim 31, wherein each land has an alignment hole formed therein; and wherein said optical coupler portion further has opposing end surfaces and a first pair of alignment pins projecting from one of the end surfaces, and a second pair of alignment pins projecting from another one of the end surfaces, said first pair of alignment pins being engageable with the optical connector when received by said housing portion, said second pair of alignment pins being receivable by respective alignment holes of said carrier.

33. A computer, comprising:

a frame;

a circuit board disposed within said frame; and an optical transceiver arrangement, comprising:

an optical coupler and housing arrangement, including a housing portion adapted to receive an optical connector of a fiber optic cable; and an optical coupler portion integrally formed with said housing portion; and a carrier assembly having a carrier connected to said housing portion, and a die chip connected to said carrier, said die chip having at least one active region, said optical coupler portion being adapted to transmit optical signals between the fiber optic cable and the active region of said die chip.

34. The computer recited in claim 33, wherein said optical transceiver arrangement further comprises:

a laminate assembly having said carrier disposed thereon, said die chip being electrically coupled to said laminate assembly; and a cover disposed over said laminate assembly and connected to said carrier.

35. The computer recited in claim 34, wherein said cover of said optical transceiver arrangement defines a heat sink disposed over said laminate assembly.

36. The computer recited in claim 35, wherein said housing portion has a rearwardly projecting ear in contact with said heat sink and establishing a gap between said carrier and said heat sink.

37. The computer recited in claim 34, wherein said optical transceiver arrangement further comprises a flex cable electrically coupling said die chip to said laminate assembly.

38. The computer recited in claim 33, wherein said housing portion comprises a first housing portion, and said optical coupler portion comprises a first optical coupler portion; wherein said optical coupler and housing arrangement further comprises a second housing portion adapted to receive a further optical connector; and a second optical coupler portion integrally formed with said second housing portion; said second housing portion being disposed adjacent to said first housing portion and connected thereto.

39. The computer recited in claim 38, wherein said optical transceiver arrangement further comprises an electromagnetic interference shield disposed around said first housing portion and said second housing portion to retain said housing portions in a side-by-side relationship.

40. The computer recited in claim 33, wherein said cover is a heat sink for transferring heat from said laminate assembly.

41. The computer recited in claim 33, further comprising a tailstock attached to said frame;

wherein said optical transceiver arrangement further includes an electromagnetic interference shield disposed about said housing portion, and being engageable with said tailstock.

42. A method of making an optical coupler and housing arrangement, comprising:

integrally forming together a housing portion and an optical coupler portion, said integrally forming including:

adapting the housing portion to receive an optical connector of a fiber optic cable; and adapting the optical coupler portion to transmit optical signals to and from the fiber optic cable.

43. The method recited in claim 42, wherein said integrally forming includes molding the housing portion and the optical coupler portion.

44. The method recited in claim 43, wherein the housing portion and the optical coupler portion are simultaneously molded in a same operation.

45. The method recited in claim 44, wherein the housing portion and the optical coupler portion are simultaneously injection molded in the same operation.

46. The method recited in claim 42, wherein said integrally forming includes:

arranging a plurality of optical fibers in a predetermined configuration; and after said arranging, performing a molding operation to simultaneously form said housing portion and said optical coupler portion while maintaining the predetermined configuration.

47. The method recited in claim 46, wherein said arranging includes aligning end faces of the optical fibers.

48. The method recited in claim 46, wherein said performing includes performing an injection molding operation.

49. The method recited in claim 46, wherein said performing forms the optical coupler to have opposing end surfaces, with each of the optical fibers extending from one of the end surfaces to another one of the end surfaces.

50. The method recited in claim 46, wherein said performing includes molding the housing portion to have a recess for receiving the optical connector of the fiber optic cable, and to have integrally formed latching fingers disposed on opposite sides of the recess, the latching fingers being adapted to engage with the optical connector to secure the optical connector within the recess.

51. The method recited in claim 46, wherein performing includes performing an injection molding operation that additionally fixes the optical fibers in place.

52. The method recited in claim 42, wherein the housing portion and the optical coupler portion are each comprised of a highly-filled polymer.

* * * * *